United States Patent [19]

Chi

[11] Patent Number: 5,212,870
[45] Date of Patent: May 25, 1993

[54] EDGE PLANER

[76] Inventor: Chih-Sung Chi, No. 37-7, Hsiapu Lane, Taiping Rd., Taiping Hsiang, Taichung Hsien, Taiwan

[21] Appl. No.: 891,945

[22] Filed: Jun. 1, 1992

[51] Int. Cl.$^5$ ............................................. B27G 23/00
[52] U.S. Cl. ........................................ 30/481; 30/281; 30/484
[58] Field of Search .................. 30/481, 478, 484, 281

[56] References Cited

U.S. PATENT DOCUMENTS

| 270,769 | 1/1883 | England | 30/478 |
|---|---|---|---|
| 293,651 | 2/1884 | Goodell | 30/281 |
| 555,228 | 2/1896 | Traut | 30/281 |
| 668,299 | 2/1901 | Traut | 30/281 |
| 778,849 | 1/1905 | Ellis | 30/478 |
| 831,893 | 9/1906 | Robinson | 30/281 |
| 3,371,417 | 3/1968 | Leibow | 30/484 |

Primary Examiner—Frank T. Yost
Assistant Examiner—Hwei-Siu Payer
Attorney, Agent, or Firm—Watts, Hoffmann, Fisher & Heinke

[57] ABSTRACT

An edge planer including a tube having two end portions, a slot longitudinally formed in the tube, one or more blade edges formed in the tube, a strip engaged in the slot, a handgrip engaged on each of the end portions of the tube, screws fixing the handgrips and the strip together, whereby, the blade edge is located between the handgrips in order to plane an edge portion of a workpiece.

4 Claims, 4 Drawing Sheets

EDGE PLANER

BACKGROUND OF THE INVENTION

1. Field of the Invention

The present invention relates to an edge planer.

2. Description of the Prior Art

A typical wood planer is shown in FIG. 6 and is suitable for planing smooth surfaces only, it is not suitable for planing edges of workpieces.

The present invention has arisen to mitigate and/or obviate the afore-described disadvantages of the conventional edge planers.

SUMMARY OF THE INVENTION

The primary objective of the present invention is to provide an edge planer which can be used for planing edges of workpieces.

In accordance with one aspect of the invention, there is provided an edge planer comprising a tube including two end portions and including a slot longitudinally formed therein and at least one blade edge formed therein opposite to the slot, a strip engaged in the slot, handgrip engaged on each of the end portions of the tube, engaging means for fixing the handgrips and the strip together, whereby, the blade edge is located between the handgrips in order to plane an edge portion of a workpiece.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
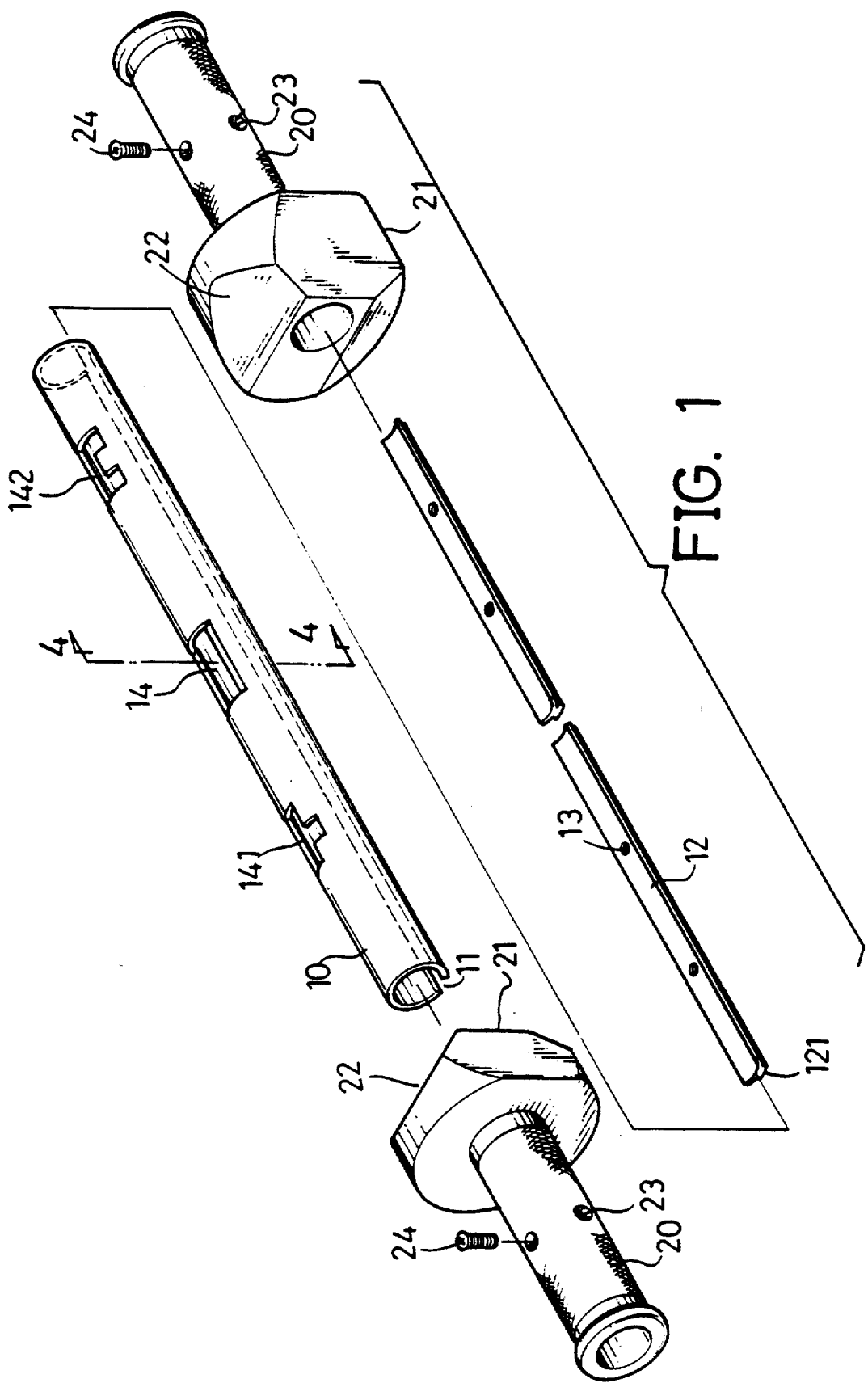
FIG. 1 is an exploded view of an edge planer in accordance with the present invention.
Figure 2:
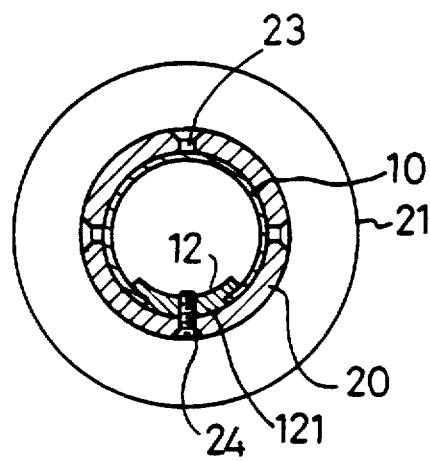
FIG. 2 is a cross sectional view taken along lines 2—2 of FIG. 3.
Figure 3:
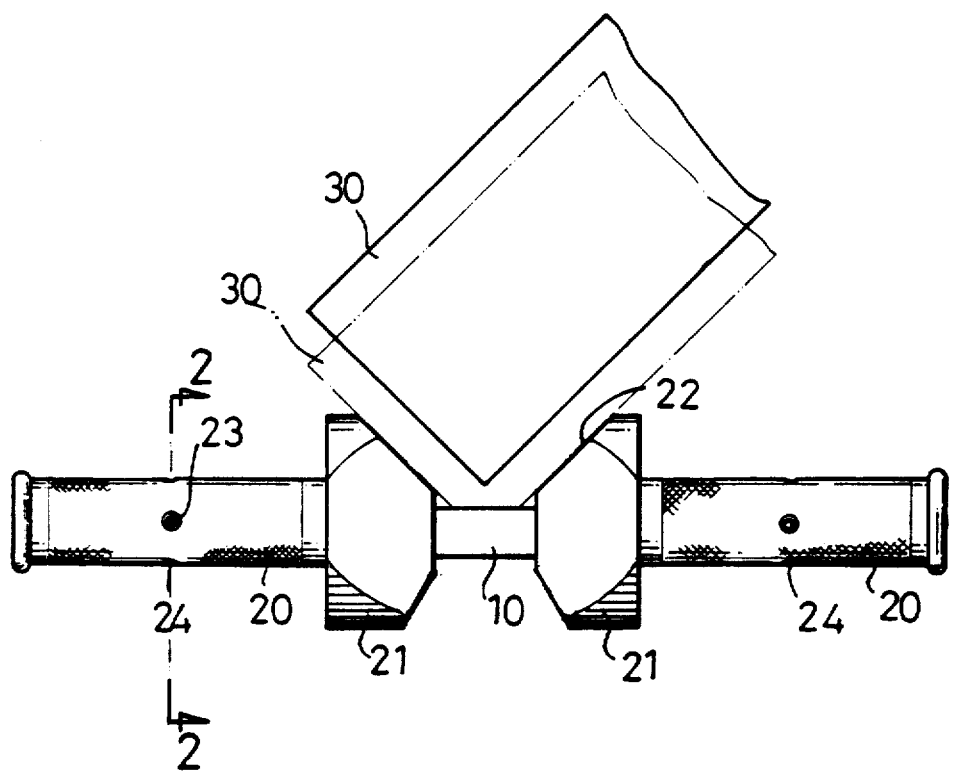
FIG. 3 is a plane view of the edge planer.
Figure 4:
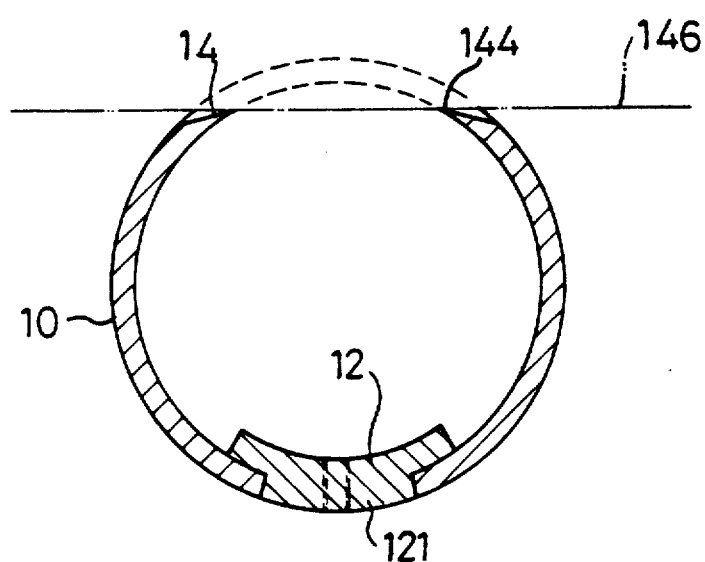
FIG. 4 is a cross sectional view taken along lines 4—4 of FIG. 1.

Referring to the drawings, and initially to FIGS. 1 to 3, an edge planer in accordance with the present invention comprises generally a tube 10 having a slot 11 longitudinally formed therein and having three blade edges 14, 141, 142 formed therein and spaced apart and opposite to the slot 11. As shown in FIG. 4, the blade edges 14 are preferably tapered relative to a plane 146 occupied by the blade tips 144 of the blade edges 14. A strip 12 includes a rib 121 longitudinally formed in the bottom portion thereof for engagement in the slot 11 of the tube 10 and includes a plurality of screw holes 13 formed therein.

Figure 5:
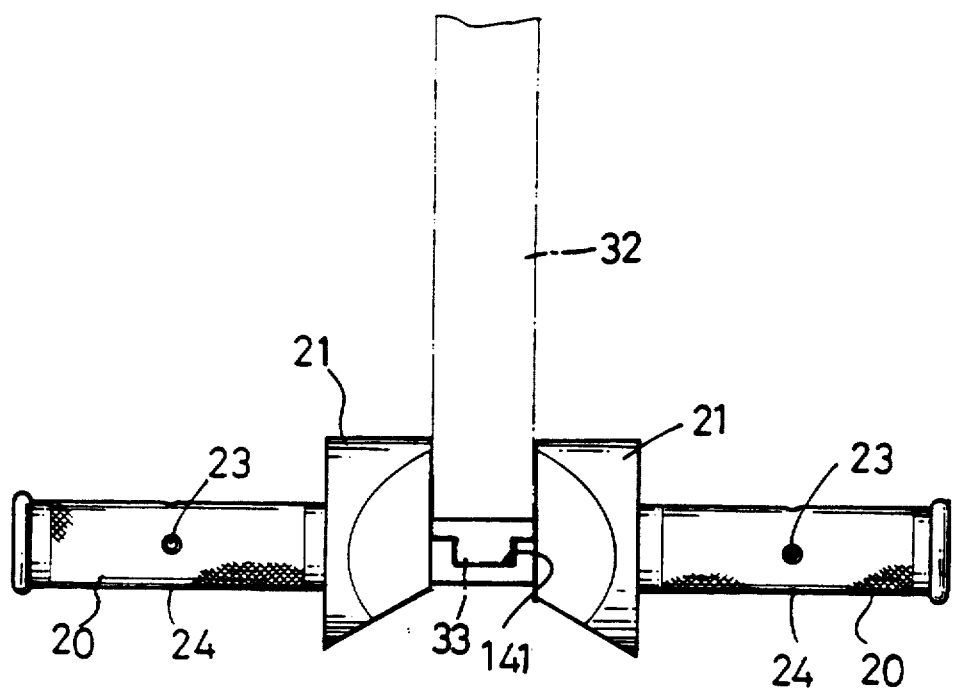
FIG. 5 is a plane view illustrating the operations of the edge planer.
Figure 6:
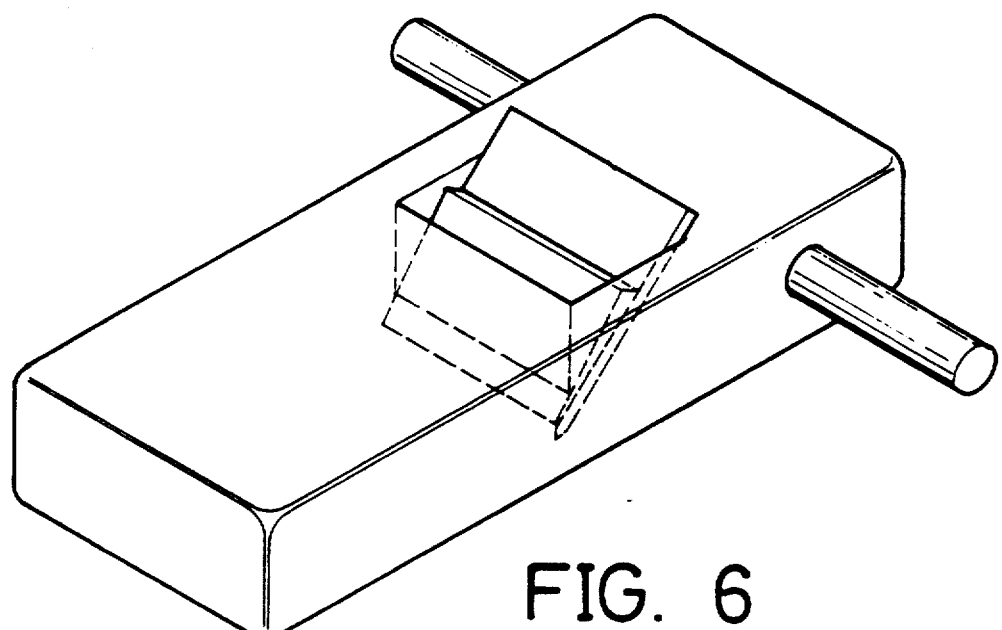
FIG. 6 is a perspective view illustrating a typical wood planer.

A handgrip 20 is engaged on each end of the tube 10 and includes a plurality of screw holes 23 formed in the middle portion of the peripheral portion thereof such that the handgrip 20 and the strip 12 can be fixed together by screws 24 and the like, best shown in FIG. 2, the handgrip 20 further includes a ring element 21 formed on one end thereof, the ring elements 21 face each other and are located in the middle portion of the tube 10. When the screws 24 are loosened, the handgrips 20 and the strip 12 are movable longitudinally along the tube 10, such that either of the blade edges 14, 141, 142 can be located and exposed between the ring elements 21, as shown in FIGS. 3 and 5. As shown in FIG. 5, the blade edge 141 is used for forming a flange 33 on a workpiece 32. Each of the ring elements 21 includes one or more tapered surfaces 22 formed therein, the tapered surfaces 22 of the ring elements 21 form different included angles therebetween, such as shown in FIG. 3, corresponding to the workpiece 30 such that the adjacent sides of the workpiece 30 contact the tapered surfaces 22 and such that the edge portion of the workpiece can be planed by the blade edge 14, 141 or 142.

Alternatively, without the slot 11 and the strip 12, the screw holes 13 can be formed directly in the tube 10 and the handgrip can be fixed directly to the tube, the handgrips 20 can also be moved and adjusted longitudinally along the tube 10 such that either of the blade edges can also be exposed.

Accordingly, the edge portions of the workpieces can be easily planed by the edge planer in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An edge planer comprising a tube including two end portions and including a slot longitudinally formed therein and at least one blade edge formed therein opposite to said slot, a strip engaged in said slot and including a plurality of first screw holes formed therein and a rib longitudinally formed in a bottom portion thereof for engagement within said slot of said tube, a handgrip engaged on each of said end portions of said tube and including a plurality of second screw holes formed therein, and engaging means for fixing said handgrips and said strip together including a plurality of screws engaged through said first screw holes and said second screw holes so that said handgrips and said strip are fixed together, whereby, said blade edge is located between said handgrips in order to plane an edge portion of a workpiece.

2. An edge planer according to claim 1, wherein each of said handgrips includes a ring element formed on one end thereof and includes at least one tapered surface formed thereon, said at least one tapered surface has an included angle formed therebetween.

3. An edge planer comprising a tube including two end portions and including a slot longitudinally formed therein and at least one blade edge formed therein opposite to said slot, a strip engaged in said slot and including a plurality of first screw holes formed therein and a rib longitudinally formed in a bottom portion thereof for engagement within said slot of said tube, a handgrip engaged on each of said end portions of said tube and including a plurality of second screw holes formed therein, and a plurality of screws engaged through said first screw holes and said second screw holes so that said handgrips and said strip are fixed together, whereby, said blade edge is located between said handgrips in order to plane an edge portion of a workpiece.

4. An edge planer according to claim 3, wherein each of said handgrips includes a ring element formed on one end thereof and includes at least one tapered surface formed thereon, said at least one tapered surface has an included angle formed therebetween.

* * * * *